United States Patent [19]

Johannsen et al.

[11] Patent Number: 6,073,162
[45] Date of Patent: Jun. 6, 2000

[54] AGENT, SYSTEM AND METHOD FOR THE SUPERVISION OF OBJECTS

[75] Inventors: Berndt Johannsen, Täby; Peter Blomkvist, Huddinge, both of Sweden

[73] Assignee: Telefonaktiebolaget LM Ericsson, Stockholm, Sweden

[21] Appl. No.: 09/077,853
[22] PCT Filed: Dec. 6, 1996
[86] PCT No.: PCT/SE96/01613
  § 371 Date: Sep. 24, 1998
  § 102(e) Date: Sep. 24, 1998
[87] PCT Pub. No.: WO97/22193
  PCT Pub. Date: Jun. 19, 1997

[30] Foreign Application Priority Data

Dec. 8, 1995 [SE] Sweden ................................. 9504393

[51] Int. Cl.[7] ............................. G06F 13/00; G06F 15/16
[52] U.S. Cl. ........................... 709/202; 709/223; 709/224
[58] Field of Search ................................... 709/202, 223, 709/224

[56] References Cited

U.S. PATENT DOCUMENTS

| | | | |
|---|---|---|---|
| 5,448,724 | 9/1995 | Hayashi . | |
| 5,452,433 | 9/1995 | Nilhart et al. . | |
| 5,504,921 | 4/1996 | Dev et al. | 709/223 |
| 5,740,368 | 4/1998 | Villalpando | 709/202 |
| 5,742,762 | 4/1998 | Scholl et al. | 709/224 |

FOREIGN PATENT DOCUMENTS

| | | |
|---|---|---|
| 0621706A2 | 10/1994 | European Pat. Off. . |
| WO94/23514 | 10/1994 | WIPO . |

OTHER PUBLICATIONS

IEEE Journal On Selected Areas In Communications, vol. 11, No. 9, Dec. 1993, New Jersey, USA, Oscar Newkerk et al., "The Common Agent—A Multiprotocol Management Agent", pp. 1346–1352.

International Symposium On Integrated Network, IFIP IC 6/WG 6.6, Apr.1993, Subrata Mazumdar et al., "Design of Protocol Independent Management Agent to Support SNMP and CMIP Queries", pp. 377–388.

*Primary Examiner*—Zarni Maung
*Assistant Examiner*—Almari Romero
*Attorney, Agent, or Firm*—Burns, Doane, Swecker & Mathis, L.L.P.

[57] ABSTRACT

A supervision system for supervising an object. The supervision system includes at least one agent unit. The object which is to be supervised is connected to at least one object access port of the agent unit. The agent unit is also connected to a superior supervisor unit by a network access port. The supervised object's operational information is received by the agent unit in a protocol specific to the object. The agent unit uses a converter to convert the object specific protocol into a protocol of the superior supervisor unit. The protocol converted operational information is communicated from the agent unit to the superior supervisor. The agent unit also includes a controller which opens a channel between the supervised object and a second supervisor in order to send the supervised object's operational information to the second supervisor including the object specific protocol.

15 Claims, 3 Drawing Sheets

AGENT, SYSTEM AND METHOD FOR THE SUPERVISION OF OBJECTS

FIELD OF INVENTION

The present invention relates to the field of object supervision, and more particularly to an agent unit for supervising at least one object, a supervising system that includes at least one such agent unit, and to a method of transferring information from one object to at least two mutually different supervising means.

DESCRIPTION OF THE BACKGROUND ART

An agent unit is a device that receives from a supervised object operational information that includes a first object specific protocol and converts this information into at least one message which is sent to a superior supervising means with a second supervising specific protocol. One such second protocol is for instance SNMP, and one such first protocol is for instance MML that is used between an agent unit and a telephone exchange.

A relatively modern supervising system in this technology is a supervising system in which objects may be coupled in some form of network and wherein one such system may include a superior supervising means, normally referred to as manager or system manager that is connected to one or more agent units, each of which functions to supervise at least one object. The agent units are able to send to the superior supervising means messages that concern the objects under their supervision. The agent units are able to send the messages on their own initiative or when requested to do so. Thus, an agent unit is a unit that possesses some intelligence and may warn the superior supervising means of a fault in the supervised object. This type of supervising system is beneficial when a superior supervising means is to supervise, or monitor, many objects. The use of agent units lightens the load on the superior supervising means. One such system is described in EP-A2-0 621 706, for instance.

It is possible in many contexts that there may exist a second supervising means of a different, normally older type, which is connected to the object and requires therefrom operational information that includes the first object specific protocol. It is therefore of interest to interconnect two such mutually different supervising means such as to obtain one single supervising system. The second, older supervising means, which is often connected directly to the object, or through the medium of a modem, communicates, however, with the object with the first object specific protocol and not with the second supervising specific protocol, and consequently incorporation of the second supervising means cannot be achieved in a simple manner.

Described in U.S. Pat. No. 5,452,433 is a computer system which performs supervising functions with respect to system components, wherein one component is comprised of supervisory software. In this case, two different supervising specific protocols, management protocols, are used in one agent, which is also software, for supervising an object so as to facilitate supervising from two different superior supervising means. Both of these protocols are of the second type that is used for communication between agent and superior supervising means.

SUMMARY OF THE INVENTION

The invention solves the problem of interconnecting old and new supervising means in a single supervising system for supervising at least one object, where a first, new supervising means requires messages concerning the operational status of the object with a second supervising specific protocol, and a second, old supervising means requires operational information from the object with a first object specific protocol.

The problem is solved by interconnecting the first and the second supervising means with the object by means of an agent unit which receives from the object operational information which includes a first object specific protocol, and which includes a protocol converter that converts this operational information into at least one message that includes a second supervising specific protocol, and a control means which opens a channel between the object and the second supervising means so as to enable the second supervising means to receive operational information that includes the first protocol.

The object of the invention is to provide an object supervising agent unit and a supervising system that includes one such agent unit that will enable supervising means that require communication with a first object specific protocol and supervising means that require a second supervising specific protocol to be incorporated in one and the same system.

This is achieved through the medium of an agent unit that is connected to an object, and a supervising system that comprises one such agent unit, wherein the agent unit receives from the object operational information that includes a first object specific protocol and comprises converter means which converts this information into at least one message that includes a second supervising specific protocol for transmission to a first superior supervising means. The agent unit also includes control means that can open a channel between the object and a second supervising means, so as to enable said second supervising means to receive operational information that includes the first protocol.

A further object of the invention is to provide a group of agent units that includes at least one agent unit of the aforesaid kind, with which connection and communication between supervising means and said group is effected through the medium of one single group connection point.

This object is achieved with the aid of an agent unit group in which the agent units are mutually connected in a local network and communicate with superior supervising means. All agent units in the group have a common group access port which is connected to the superior supervising means.

Another object is to provide a method that will enable supervising means that require communication with a first object specific protocol and supervising means that require a second supervising specific protocol to be interconnected in one single supervising system.

This object is achieved with a method in which operational information that includes a first object specific protocol is received and converted into at least one message that includes a second supervising specific protocol and said message is then transferred to a first superior supervising means and/or a channel is opened between the object and the second supervising means so that operational information containing the first protocol can be sent to a second supervising means.

The advantage afforded by the present invention is that there is obtained an agent unit which can readily interconnect, in one single system, supervising means that require communication with a first object specific protocol and supervising means that require a second supervising specific protocol.

Another advantage is that the second supervising means can be moved far away from the supervised object without requiring the use of a modem, a feature that was earlier difficult to achieve.

BRIEF DESCRIPTION OF THE DRAWINGS

Further advantages and objects of the present invention will be evident from the following description of a preferred embodiment of the invention, made with reference to the accompanying drawings, in which.

DETAILED DESCRIPTION OF A PREFERRED EMBODIMENT

Figure 1:
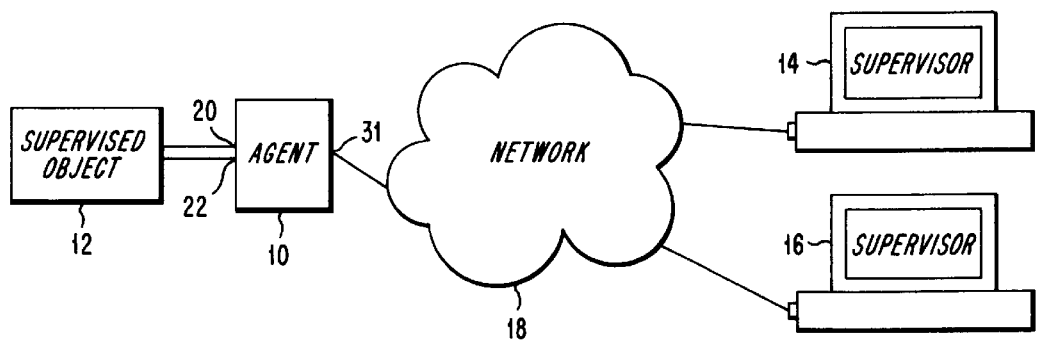
FIG. 1 illustrates an inventive supervising system.

An inventive supervising system is illustrated diagrammatically in FIG. 1, mainly in block form. The supervising system includes an agent unit 10 which has a first object access port 20 and a second object access port 22, each being connected to a respective port on an object 12 to be supervised. The agent unit 10 also includes a net access port 31 with which it is connected to a first superior supervising means 14 and to a second supervising means 16 through the medium of a network 18. The network 18 may be a public switched telephone network, a local area network, LAN, or some other form of network. Alternatively, the agent unit 10 may communicate with the supervising means 14 and 16 by radio or the like. A superior supervising means, often referred to as "manager" or "management platform" will often include a PC or a working station, for instance in UNIX environments, so as to enable persons responsible for supervising a plurality of objects to see the operational status of said objects when necessary.

The object 12 may be any one of a number of different types of devices that perform different functions. For instance, the object concerned may be a burglar alarm system, a coffee-making machine, a telephone exchange, or some other device connected to a network, such as a computer, for instance.

The object 12 communicates with the agent unit 10 in accordance with a first protocol that is specific to the type of object concerned. For instance, a telephone exchange requires the agent unit 10 to be a special agent unit that uses a protocol peculiar to this exchange, which may be MML, for instance. The first supervising means 14 communicates with the agent unit with a second, supervising specific protocol, for instance SNMP or CMIP, and the second supervising means 16 communicates with the agent unit 10 with the first object specific protocol. In this regard, the second supervising means 16 is an older type of supervisor that in earlier techniques has been connected to the object either directly or through the medium of a modem.

Figure 2:
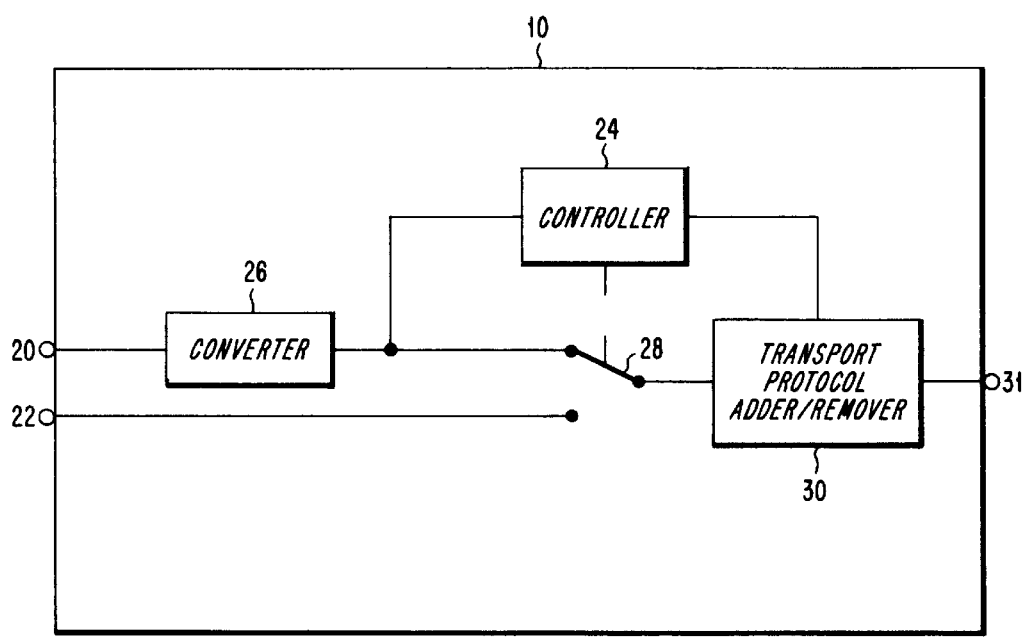
FIG. 2 illustrates an inventive agent unit.

FIG. 2 illustrates an inventive agent unit 10 schematically and mainly in block form. The agent unit 10 includes a network access port 31, which is connected to the network. The network access port 31 is connected to a switch means 28 via a transport protocol means 30. In this embodiment, the switch means 28 has the form of a multiplexor. The transport protocol means 30 is adapted to either add or remove a third transport protocol, and in some instances a fourth supervising specific protocol, to and from the messages that are transferred between the agent unit 10 and respective supervising means 14 and 16. In a first switch position, the switch means 28 connects the transport protocol means 30 with a converter means 26, and in a second switch position connects the transport protocol means with the second object access port 22. The converter means 26 is connected to the first object access port 20. The agent unit 10 also includes a control means 24 that is connected to the transport protocol means 30 and also to the connection point between the converter means 26 and the switch means 28. The control means 24 is also adapted to cause the switch means 28 to switch between its two positions. The aforesaid means are realized in the form of a microprocessor and a memory with associated software.

The agent unit 10 functions as a typical agent unit in relation to the first supervising means 14, i.e. the switch means 28 is in its first position and connects the converter 26 with the transport protocol means 30 and the agent unit senses the operational status of the object 12 connected thereto, via the first object access port 20. This can take place either on the initiative of the agent unit, i.e. started by the control means 24, or in response to a query from the first superior supervising means 14. The agent unit 10 thus controls the object 12 and receives therefrom operational information with the first protocol, which is converted in the converter 26 to one or more messages that include the second supervising specific protocol. These messages are then sent to the transport protocol means 30, either directly or after intermediate storage in a memory (not shown) wherein the transport protocol means 30 adds a transport protocol, e.g. UDP/IP, to said messages and transfers the messages to the first supervising means 14. Other types of information can also be sent from the control means 24, such as an alarm or like information, and these messages are also sent with the second protocol and the transport protocol. Thus, operational information can be transferred to the first supervising means by the agent unit 10 either on the initiative of the unit or in response to a query. Naturally, the messages are also received from the first supervising means at the network access port 31. These messages are sent with said transport protocol and the second protocol, wherein the transport protocol is removed in the transport protocol means 30 and the messages then transferred to the control means 24.

On the other hand, the agent unit 10 is completely transparent in relation to the second supervising means 16, i.e. the second supervising means 16 "senses" that it communicates directly with the object 12. The agent unit 10 then throughputs all operational information that is transferred between the object 12 and the second supervising means 16, without influencing the content of the information.

Figure 3:
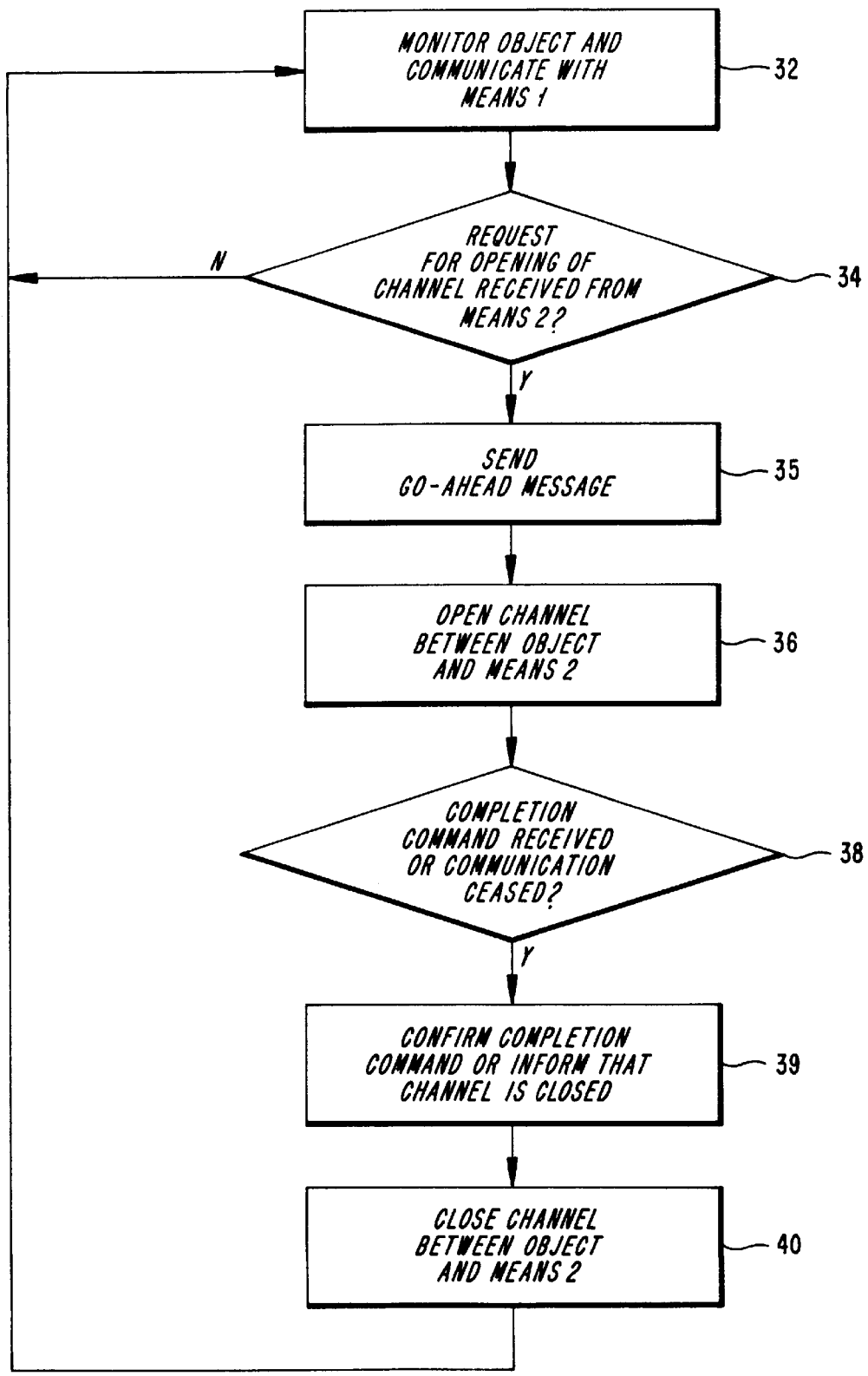
FIG. 3 is a flowchart that describes a method of transferring messages in accordance with the invention.

FIG. 3 is a flowchart that illustrates communication procedure between the object and the second supervising means. This method of procedure will now be described with reference to FIGS. 2 and 3. The control means 24 monitors the object and communicates with the first supervising means 14 in the aforedescribed manner, block 32. The control means also monitors continuously the traffic across the network access port 31 and the transport protocol means 30. The second supervising means 16 sends the messages which include the fourth supervising specific protocol, which may be TELNET, for instance, and a transport protocol, said transport protocol being essentially the same as that used in respect of the first supervising means. This transport protocol may be a slightly different protocol, e.g. TCP/IP. When the second supervising means 16 needs to check the operational status of the object, it requests the agent unit 10 to connect it with the object. The agent unit 10 detects this request, block 34, and removes the transport protocol and the fourth protocol from this request in the transport protocol means 30. The request is then transferred to the control means 24, which then sends to the second supervising means 16 a go-ahead signal for communication with the object, block 35. This go-ahead signal is also sent with the fourth protocol and the transport protocol. The control means 24 then switches the position of the second switch means 28 from its first to its second position, so as to open the channel, block 36, and therewith connect the transport protocol means 30 to the second object access port 22. Communication then takes place directly between the object and the second supervising means, through the medium of the now transparent agent unit 10. The agent unit is said to be transparent because the second supervising means "senses" that it communicates directly with the object. The fourth supervising specific protocol and the transport protocol are then added in the transport protocol means 30 to operational information that includes the first protocol and sent from the agent unit 10 to the second supervising means 16. A request for operational information is also sent to the object from the second supervising means. One such request is sent with the first protocol, the fourth protocol and the transport protocol, these two latter protocols being removed in the transport protocol means 30 so that said request will reach the object with the first protocol. When the second supervising means has obtained all requisite operational information and has sent a completion command to the agent unit 10, or when no communication has taken place between the object and the second supervising means for a given specific length of time, block 38, the control means 24 will either confirm the completion command or send a message to close the channel, block 39, and thereafter close the channel, block 40. The channel is closed by switching the switch means 28 to its first position. The transport protocol means 30 also returns to its mode of solely removing and adding the transport protocol from and to transferred messages.

In the above-described method, information is transferred from the agent unit to the first superior supervising means at the same time as the channel is open, i.e. the control means changes the setting of the switch means alternately and very quickly, therewith changing protocol in the transport protocol means. The second supervising means 16 thus "senses" that it has a constant open channel to the object, whereas the first supervising means 14 "senses" that it communicates with the agent unit 10 without interruption.

In an alternative embodiment, the agent unit includes two different transport protocol means, each being located in a respective conductor on opposite sides of the switch means 28 in relation to the agent unit 10 described with reference to FIG. 2.

The operational information received by the second supervising means need not be the same operational information as that received by the first supervising means. Furthermore, the control means 24 may be adapted to recognize an operational information request that is addressed directly to the object, and then change the setting of the switch means in accordance with this request and send said request to the object.

In the embodiment illustrated in FIGS. 1 and 2, the agent unit 10 has two object access ports connected to the object. The first of these object access ports connects the object with a part of the agent unit that converts operational information from the first to the second protocol, while the other object access port connects the object to a part of the agent unit that functions as a channel through which operational information is fed with the first protocol, i.e. without being influenced by the agent unit. However, it is conceivable that the number of object access ports can be reduced to one and to use instead a further switch means, for instance in the form of a multiplexer.

According to an alternative variant, the agent unit may be adapted to serve one supervising means at a time. In other words, the channel is closed when the first supervising means is served by the agent unit, and vice versa.

In another variant of the inventive system, several objects to be supervised are connected to one single agent unit.

The superior supervising means often include a personal computer or a working station so that operators involved with supervising the objects are able to ascertain their operational statuses and decide what shall be done when a need arises. Naturally, the inventive system may include several superior supervising means, including superior supervising means that require the agent unit to be transparent and superior supervising means that communicate with the agent unit in order to obtain operational information.

The described agent unit provides a highly flexible system that permits old supervising equipment adapted to communicate directly with a supervised object to be combined with a supervising means that supervises an object through the medium of an agent unit.

Figure 4:
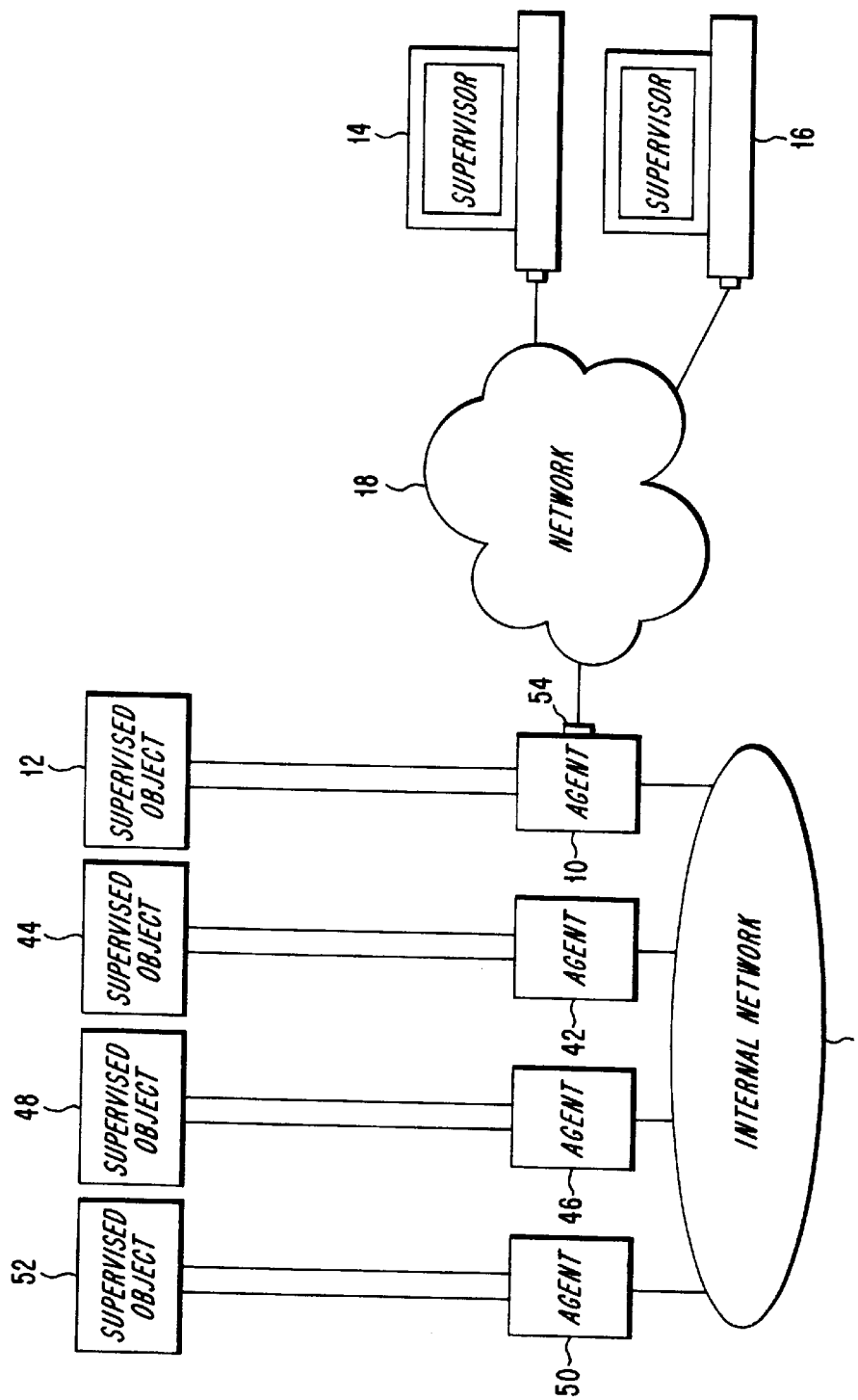
FIG. 4 illustrates a supervising system that includes a group of agent units connected in a local network, in accordance with the invention.

FIG. 4 illustrates a further variant of the invention in which the agent unit 10 is connected to a number of further agent units 42, 46 and 50, which may optionally be of the same kind as the inventive agent unit 10. Each of these further agent units 42, 46 and 50 is connected to a respective object 44, 48 and 52. All agent units form a group and are mutually interconnected in an internal network 56. In the illustrated case, the internal network has the form of a token ring, although it may alternatively have the form of a bus. All agent units 10, 42, 46 and 50 communicate with said superior supervising means 14 and 16 through the medium of a group access port 54 provided on the first agent unit 10. As in the earlier case, the first agent unit 10 and the two superior supervising means 14 and 16 are interconnected through the network 18.

All communication between the superior supervising means 14 and 16 and the agents 10, 42, 46 and 50 takes place through the medium of the first agent unit 10, which is adapted to forward to the network 18 messages arriving from the internal network 56 and intended for the superior supervising means 14 and 16. The use of agent units for supervising objects relieves the load on the superior supervising means 14, which may be intended for supervising many other agent units and associated objects outside the group. The group access port 54 is similar to the network access port 31 on the agent 10 in FIGS. 1 and 2, and may equally as well be provided on any one of the agent units.

The use of a hub or a router for connecting the agent units to the superior supervising means 14 and 16 is avoided in the arrangement illustrated in FIG. 4.

The system illustrated in FIG. 4 can be varied in many ways. The method of connection between the superior supervising means 14 and 16 and the agent units 10, 42, 46 and 50 can vary. However, when a public switched telephone network is used, it is necessary in most cases to connect at least one modem between the group access port 54 of the first agent unit 10 and the network 18.

In the case of this embodiment, the agent units 10, 42, 46 and 50 are included in a cassette (not shown) that includes a back plane bus which forms the internal network 56. The cassette has a specific size and several cassettes can be readily connected together so as to enable the inclusion of more agent units than is permitted by the particular size of the cassette.

What is claimed is:

1. An agent unit (10) for supervising at least one object (12) and comprising at least one object access port (20, 22) to which the object shall be connected, and at least one network access port (31) intended for use for communication with at least one first superior supervising means (14), wherein the agent unit receives from the object operational information that includes a first object specific protocol, and comprises a converter (26) for converting said operational information into one or more messages that include a second supervising specific protocol for transmission to the first superior supervising means, characterized in that the agent unit (10) includes a control means (24) that is functional to open a channel between the object (12) and a second supervising means (16) so as to enable the second supervising means (16) to receive operational information deriving from said object and including the first protocol.

2. An agent unit (10) according to claim 1, characterized in that the control means (24) is operative in controlling a switch means (28) to open the channel in response to a detected request arriving from the second supervising means (16).

3. An agent unit (10) according to claim 1 or characterized in that the control means (24) functions to control the switch means (28) to close the channel subsequent to the receipt of a completion message from the second supervising means (16), or when no communication has taken place between the object (12) and the second supervising means within a given specified time period.

4. An agent unit (10) according to claim 1 characterized by a transport protocol means (30) which is adapted to at least add and remove a transport protocol to and from operational information and the messages that are transferred between the agent unit (10) and the supervising means (14, 16).

5. An agent unit group for supervising objects (12, 44, 48, 52) and including at least two agent units (10, 42, 46, 50) that are mutually connected in an internal network (56) and receive from objects connected thereto operational information that includes one or more object specific protocols, wherein each of said agent units includes a converter (26) for converting said operational information into one or more messages that include a supervision specific protocol for transmission to at least one first superior supervising means (14), characterized by a group access port (54) which is common to all agent units (10, 42, 46, 50) in the group and which is intended for connection to the first and at least one second supervising means (14, 16); and in that at least one agent unit (10) includes a control means (24) which is able to open a channel between the object (12) connected to said agent unit and the second supervising means, so as to enable the second supervising means (16) to receive object-originating operational information that includes the protocol specific to this object.

6. An object supervising system comprising at least one first superior supervising means (14), at least one second supervising means (16), at least one agent unit (10), and at least one object (12), wherein the object is connected to the agent unit that is connected to the supervising means (14, 16) and receives from the object operational information that includes an object specific protocol, wherein the agent unit includes a converter (26) that converts said operational information into one or more messages that include a supervising specific protocol for transmission to the first supervising means, characterized in that the agent unit (10) includes a control means (24) which is functional to open a channel between the object (12) and the second supervising means (16) and therewith enable the second supervising means to receive object-originating operational information that includes the protocol specific to said object.

7. A supervising system according to claim 6, characterized in that the agent unit (10) is connected to the first and to the second supervising means (14, 16) through the medium of a network (18).

8. A method of transferring information from an object (12) to at least a first superior supervising means (14) and at least one second supervising means (16), comprising receiving operational information that includes a first object specific protocol, converting said operational information into at least one message that includes a supervising specific second protocol, and sending said message to the first supervising means (14), characterized by opening a channel (36) between the object (12) and the second supervising means (16) so that operational information that includes the first protocol can also be sent to the second supervising means.

9. A method according to claim 8, characterized by opening the channel in response to a request, (34), arriving from the second supervising means (16).

10. A method according to claim 8, characterized by closing the channel, (40), in response to a completion command arriving from the second supervising means (16), or because no communication has taken place between the object (12) and the second supervising means for a given specific time period, (38).

11. A method according to claim 8, characterized by adding at least one transport protocol to the message and to said operational information prior to sending said message and said operational information to the first and the second supervising means (14, 16), and removing said transport protocol from the messages that are received from said first and said second supervising means.

12. An agent unit for supervising at least one object and including
- at least one object access port to which the object is to be connected;
- at least one network access port intended to be used for communication with at least one first superior supervising means;
- a converter; and
- a control means;
- wherein the agent unit receives from the object operational information that includes an object specific first protocol, wherein the converter is adapted to convert this information into one or more messages that include a supervising specific second protocol for transmission to the first superior supervising means; and
- wherein the control means is functional to open a channel between the object and the second supervising means to enable at least one second superior supervising means to receive from the object operational information that includes the object specific first protocol.

13. An agent group for supervising objects and comprising
- at least two agent units that are mutually connected in an internal network and receive from objects connected thereto operational information that includes one or more object specific protocols, and each of which includes a converter for converting said operational information into one or more messages that includes/include a supervising specific protocol, for transmission to at least one first superior supervising means;

wherein a group access port is common to all agent units in the group, said group access port being intended for connection to the first and to at least one second supervising means; and wherein at least one agent unit includes a control means that can open a channel between the object connected to said agent unit and the second supervising means so as to enable at least one other supervising means to receive from the object operational information that includes the specific protocol of this object.

14. An object supervising system comprising at least one first superior supervising means and at least one second supervising means, at least one agent unit, and at least one object;

wherein the object is connected to the agent unit that is connected to said supervising means;

wherein the agent unit receives from the object operational information that includes an object specific protocol, and includes a converter for converting said operational information into one or more messages that includes/include a supervising specific protocol for transmission to the first superior supervising means; and wherein the agent unit also includes a control means that can open a channel between the object and the second supervising means so as to enable the second supervising means to receive from said object operational information that includes said object specific protocol.

15. A method of transferring information from an object to at least a first superior supervising means and at least one second supervising means comprising receiving operational information that includes a first object specific protocol;

converting this operational information into at least one message that includes a supervising specific second protocol;

sending said message to the first supervising means; and opening a channel between the object and the second supervising means so that operational information that includes the first protocol can also be sent to the second supervising means.

* * * * *